(12) United States Patent
Wang

(10) Patent No.: US 6,746,530 B2
(45) Date of Patent: Jun. 8, 2004

(54) HIGH CONTRAST, MOISTURE RESISTANT ANTISTATIC/ANTIREFLECTIVE COATING FOR CRT DISPLAY SCREEN

(75) Inventor: Shi-Sheng Wang, Taipei (TW)

(73) Assignee: Chunghwa Pictures Tubes, Ltd., Taoyuan (TW)

( * ) Notice: Subject to any disclaimer, the term of this patent is extended or adjusted under 35 U.S.C. 154(b) by 296 days.

(21) Appl. No.: 09/921,342

(22) Filed: Aug. 2, 2001

(65) Prior Publication Data

US 2003/0029357 A1 Feb. 13, 2003

(51) Int. Cl.$^7$ ............................. H01J 29/88; C09D 5/32
(52) U.S. Cl. ......................... 106/287.16; 106/287.14; 106/287.11; 313/479
(58) Field of Search ................. 313/479; 106/287.11, 106/287.14; 160/287.16

(56) References Cited

U.S. PATENT DOCUMENTS

| | | | |
|---|---|---|---|
| 2,522,531 A | 9/1950 | Mochel | 117/54 |
| 2,564,677 A | 8/1951 | Davis | 201/73 |
| 2,564,707 A | 8/1951 | Mochel | 117/54 |
| 2,564,709 A | 8/1951 | Mochel | 201/73 |
| 2,564,710 A | 8/1951 | Mochel | 201/73 |
| 2,612,611 A | 9/1952 | Szegho et al. | 250/80 |
| 2,680,205 A | 6/1954 | Burton | 313/92 |
| 2,734,142 A | 2/1956 | Bames | 313/92 |
| 2,808,351 A | 10/1957 | Colbert et al. | 117/211 |
| 2,833,902 A | 5/1958 | Gaiser et al. | 201/73 |
| 2,852,415 A | 9/1958 | Colbert et al. | 117/211 |
| 2,919,212 A | 12/1959 | Gaiser | 117/215 |
| 2,977,412 A | 3/1961 | Rhodes et al. | 178/7.85 |
| 3,093,598 A | 6/1963 | McMillan et al. | 252/521 |
| 3,252,829 A | 5/1966 | Romstadt et al. | 117/211 |
| 3,689,312 A | 9/1972 | Long, III et al. | 117/94 |
| 3,738,732 A | 6/1973 | Ikenda | 117/33.3 |
| 4,263,335 A | 4/1981 | Wagner et al. | 427/29 |
| 4,393,095 A | 7/1983 | Greenberg | 427/87 |
| 4,463,114 A | 7/1984 | Balchunis et al. | 524/157 |
| 4,468,702 A | 8/1984 | Jandrell | 358/245 |
| 4,490,227 A | 12/1984 | Bitter | 204/192 |
| 4,563,612 A | 1/1986 | Deal et al. | 313/478 |
| 4,649,126 A | 3/1987 | Gaprindashvili et al. | 501/43 |
| 4,650,557 A | 3/1987 | Bitter | 204/192.12 |
| 4,695,045 A | 9/1987 | Chase et al. | 269/152 |
| 4,785,217 A | 11/1988 | Matsuda et al. | 313/479 |
| 4,857,361 A | 8/1989 | Bloss et al. | 427/109 |
| 4,884,006 A | 11/1989 | Prazak, III | 313/474 |
| 4,885,501 A | 12/1989 | Tong | 313/402 |
| 4,930,015 A | 5/1990 | Dougherty et al. | 358/246 |
| 4,945,282 A | 7/1990 | Kawamura et al. | 313/479 |
| 4,958,148 A | 9/1990 | Olson | 340/712 |
| 4,987,338 A | 1/1991 | Itou et al. | 313/478 |
| 5,011,443 A | 4/1991 | Park | 445/2 |
| 5,051,652 A | 9/1991 | Isomura et al. | 313/479 |
| 5,099,171 A | 3/1992 | Daiku et al. | 313/479 |
| 5,122,709 A | 6/1992 | Kawamura et al. | 313/479 |
| 5,150,004 A | 9/1992 | Tong et al. | 313/479 |
| 5,189,337 A | 2/1993 | Endo et al. | 313/479 |
| 5,200,667 A | 4/1993 | Iwasaki et al. | 313/478 |
| 5,204,177 A | 4/1993 | Sato et al. | 428/328 |
| 5,241,097 A | 8/1993 | Zupancic et al. | 556/460 |
| 5,254,904 A | 10/1993 | Van De Leest et al. | 313/479 |
| 5,279,851 A | 1/1994 | Minosou et al. | 427/126.2 |
| 5,291,097 A | 3/1994 | Kawamura et al. | 313/478 |
| 5,322,540 A | 6/1994 | Jacquet et al. | 65/60.2 |
| 5,370,981 A | 12/1994 | Krafft et al. | 430/529 |
| 5,372,924 A | 12/1994 | Quintens et al. | 430/527 |
| 5,376,308 A | 12/1994 | Hirai et al. | 252/518 |
| 5,378,404 A | 1/1995 | Han et al. | 252/500 |
| 5,382,383 A | 1/1995 | Hirai et al. | 252/501.1 |
| 5,387,433 A | 2/1995 | Balian et al. | 427/126.3 |
| 5,404,073 A | 4/1995 | Tong et al. | 313/479 |
| 5,412,279 A | 5/1995 | De Boer | 313/479 |
| 5,443,944 A | 8/1995 | Krafft et al. | 430/529 |
| 5,489,369 A | 2/1996 | Bjornard et al. | 204/298.25 |
| 5,492,762 A | 2/1996 | Hirai et al. | 428/447 |
| 5,523,114 A * | 6/1996 | Tong et al. | 427/68 |
| 6,268,457 B1 * | 7/2001 | Kennedy et al. | 528/39 |

FOREIGN PATENT DOCUMENTS

| | | |
|---|---|---|
| EP | 0 585 819 A1 | 8/1993 |
| JP | 3-167739 | 7/1991 |
| JP | 5-36365 | 2/1993 |

OTHER PUBLICATIONS

Chang, Raymond; Chemistry 3rd ed.; *Acids and Bases: General Properties*, pp. 622–623.

* cited by examiner

*Primary Examiner*—David Brunsman
(74) *Attorney, Agent, or Firm*—Emrich & Dithmar LLC

(57) ABSTRACT

In general, increased video image contrast is achieved by reducing light transmission through an antistatic/antireflective (ASAR) coating disposed on the surface of the display screen of a cathode ray tube (CRT) by adding an organic dye to the coating. A silane coupling agent is added to the coating to prevent diffusion of the dye out of the coating which gives rise to undesirable water marks on the display screen. However, the silane coupling agent at the required concentrations weakens the mechanical strength of the coating, reduces its electrical conductivity, and changes its light reflective index. To avoid this, two or more different silane coupling agents are added to the ASAR coating with the plural silane coupling agents having an additive, or combining, effect which allows for the use of reduced amounts of the coupling agents and avoids the aforementioned problems. One agent is hydrophobic, while the other bonds to the organic dye.

9 Claims, 3 Drawing Sheets

HIGH CONTRAST, MOISTURE RESISTANT ANTISTATIC/ANTIREFLECTIVE COATING FOR CRT DISPLAY SCREEN

FIELD OF THE INVENTION

This invention relates generally to the display screen of a cathode ray tube (CRT) and is particularly directed to an antistatic/antireflective coating disposed on the outer surface of a CRT's display screen.

BACKGROUND OF THE INVENTION

Self-emitting display devices, such as of the CRT type, provide a video image by the bombardment of phosphor elements disposed on the inner surface of the device's display screen by high energy electrons. The phosphor elements are generally of three types in producing the primary colors of red, green, and blue in providing a color video image on the display screen. For optimum color purity, the three groups of color phosphors should emit light characterized by three discrete spectra, with no overlap between adjacent spectral components. In practice, however, there is always some overlap between adjacent spectral components. However, by minimizing adjacent color overlap, color contrast is improved to provide a more visually pleasing video image. A high level of contrast is normally obtained by reducing the light transmission characteristic of the coating.

There are currently two approaches to increasing the color contrast of a video image on the display screen of a CRT. One approach involves the addition of organic dyes in a surface coating disposed in the form of a thin layer in the outer surface of the CRT's display screen. The other approach to increasing video image color contrast is through the use of inorganic pigments in the display screen's outer surface coating. Unfortunately, inorganic pigments are characterized as having only limited solubility and are difficult to disburse in organic solvents. Thus, the use of organic dyes in the display screen's surface coating is the more commonly used approach for increasing color video image contrast.

U.S. Pat. No. 4,987,338 to Itou et al. discloses an antistatic/antiglare coating in the form of a single layer to which an organic dye is added. This approach is not particularly desirable because the organic dye is subject to bleaching out of the coating when the face plate is wiped with a wet cloth containing either water or alcohol. U.S. Pat. No. 5,291,097 to color Kawamura et al teaches the addition of an organic dye to the inner antistatic layer of a double-layer layer antireflective/antistatic coating on the outer surface of the CRT's display screen. The inner antistatic layer containing the organic dye is then covered with the outer antireflective layer. Even with the inner antistatic layer covered by a protective outer antireflective layer, the organic dye has been observed to diffuse outwardly from the inner antistatic layer and through the outer antireflective layer with the organic dye eventually bleaching out of the antireflective/antistatic coating on the faceplate through repeated wiping of the faceplate with either a dry or wet cloth. This results in undesirable water marks on the surface. Washing out of the dye from the display screen's outer surface coating is a particularly serious problem in a high temperature and high humidity environment.

In the past, a silane coupling agent has been added to the antireflective solution to bond to the dye and prevent its bleaching out. This approach is disclosed in U.S. Pat. No. 5,523,114 wherein one end of the silane coupling agent links to the dye and its other end links to $SO_2$. Unfortunately, the large amounts of silane coupling agent required to reduce washing out of the dye also tends to weaken the mechanical strength of the coating and change its light refractive index. In addition, large amounts of silane coupling agent lower the coating's electrical conductivity due to the relatively high content of nonconductive compounds. In some cases, a water soluble polymer having a structure similar to that of a dye as well as to that of a silane coupling agent is added to the antireflective coating. The dye is stabilized by linking the Si end of the polymer with the $SiO_2$ in the antireflective coating.

The present invention addresses the aforementioned problems encountered in the prior art by providing an outer layer surface coating for the outer surface of a CRT display screen which includes a first silane coupling agent which reacts with the silica in the glass display screen to provide a high degree of adherence and a second silane coupling agent which is hydrophobic for preventing moisture from permeating into the coating layer at high humidities. This combination of silane coupling agents provides the display screen's surface coating with a high degree of hardness, increased electrical conductivity, and reduced reflectivity.

OBJECTS AND SUMMARY OF THE INVENTION

Accordingly, it is an object of the present invention to provide an improved antistatic and/or antireflective coating for the outer surface of the display screen of a cathode ray tube (CRT) which provides a high level of color video image contrast without reducing the mechanical strength, changing the refractive index, or increasing the reflectivity of the display screen coating.

It is another object of the present invention to provide an antistatic and/or antireflective coating for a CRT display screen which retains its mechanical properties and stability at high temperatures and humidity levels, transmits reduced light for improved video image contrast, and maintains high electrical conductivity for effective electrostatic discharge.

A further object of the present invention is to improve the mechanical strength, abrasion resistance, and optical characteristics of an antistatic and/or antireflective coating for the surface of a display screen of a self-emitting color display device by adding reduced amounts of silane coupling agents to the coating.

The present invention contemplates for use on an outer surface of a glass faceplate of a self-emitting display device, wherein the glass faceplate includes a phosphor coating on an inner surface thereof, and wherein the phosphor coating is responsive to energetic electrons incident thereon for providing light for presentation of a video image on the glass faceplate, a coating comprising: an antireflective layer disposed on the outer surface of the faceplate; an organic dye disposed in the antireflective layer for increasing color purity and contrast of the video image presented on the glass faceplate; a first binding agent disposed in the antireflective layer for bonding to the dye and preventing diffusion of the dye out of the antireflective layer; and a second binding agent disposed in and bonded to the antireflective layer for providing the antireflective layer with increased water resistance for preventing washing out of the dye from the antireflective layer.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
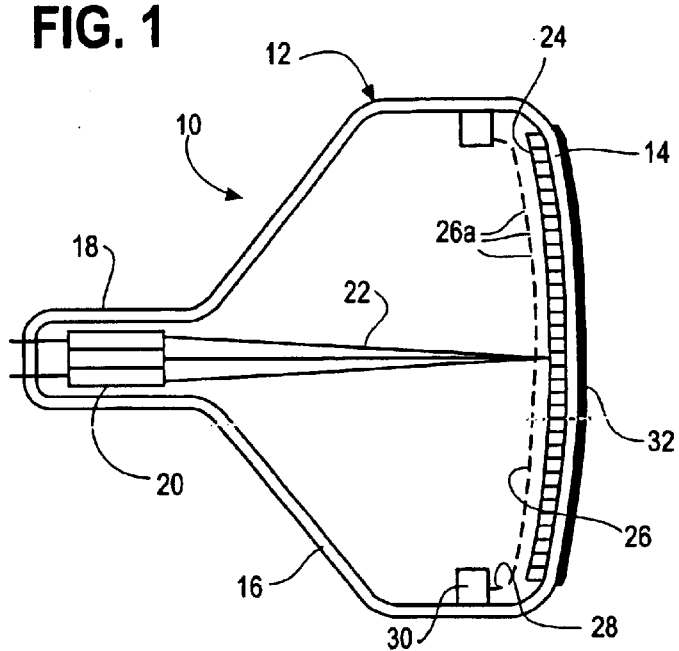
FIG. 1 is a longitudinal sectional view of a CRT incorporating a high contrast, moisture resistant antistatic/antireflective coating on the outer surface of its display screen.

Referring to FIG. 1, there is shown a longitudinal sectional view of a color CRT 10 incorporating an antistatic/antireflective coating 32 in accordance with the present invention. In the following discussion the term "display screen", "display panel" and "faceplate" are used interchangeably. In addition, the terms "layer" and "coating" are used synonymously. CRT 10 includes a sealed glass envelope 12 having a forward faceplate or display screen 14, an aft neck portion 18, and an intermediate funnel portion 16. Disposed on the inner surface of glass display screen 14 is a phosphor screen 24 which includes plural discrete phosphor deposits, or elements, which emit light when an electron beam is incident thereon to produce a video image on the display screen. Color CRT 10 includes three electron beams 22 directed onto and focused upon the CRT's glass display screen 14. Disposed in the neck portion 18 of the CRT's glass envelope 12 are plural electron guns 20 typically arranged in an inline array for directing the electron beams 22 onto the phosphor screen 24. The electron beams 22 are deflected vertically and horizontally in unison across the phosphor screen 24 by a magnetic deflection yoke which is not shown in the figure for simplicity. Disposed in a spaced manner from phosphor screen 24 is a shadow mask 26 having a plurality of spaced electron beam passing apertures 26a and a skirt portion 28 around the periphery thereof. The shadow mask skirt portion 28 is securely attached to a shadow mask mounting fixture 30 around the periphery of the shadow mask. The shadow mask mounting fixture 30 is attached to an inner surface of the CRT's glass envelope 12 and may include conventional attachment and positioning structures such as a mask attachment frame and a mounting spring which also are not shown in the figure for simplicity. The shadow mask mounting fixture 30 may be attached to the inner surface of the CRT's glass envelope 12 and the shadow mask 26 may be attached to the mounting fixture by conventional means such as weldments or a glass-based frit.

Figure 2:
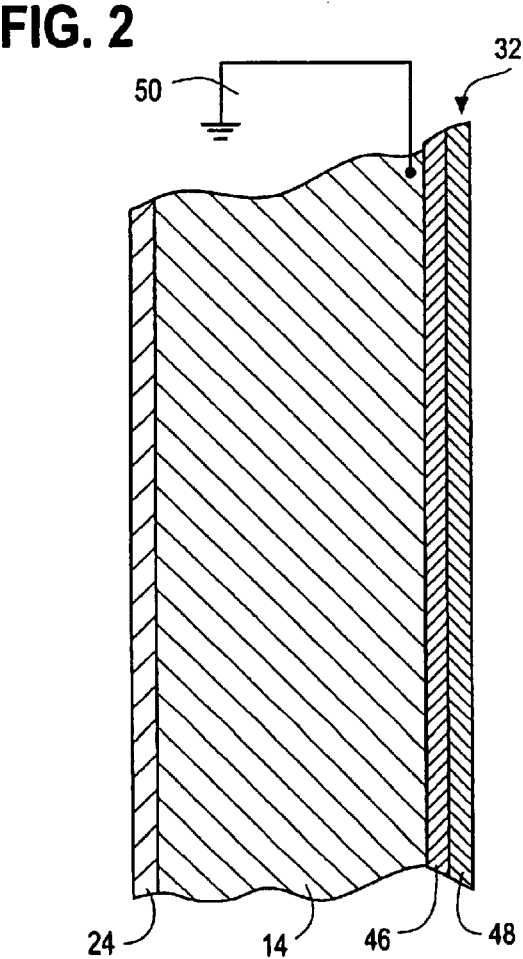
FIG. 2 is a partial sectional view of a flat display screen having an outer coating comprised of an inner antistatic layer and an outer antireflective layer in accordance with one embodiment the present invention.

Referring to FIG. 2, there is shown a partial sectional view of a portion of the CRT's glass display screen 14 having the aforementioned phosphor layer 24 on the inner surface thereof and an outer antistatic/antireflective coating 32 on the outer surface thereof in accordance with another embodiment of the present invention. The glass display screen 14 of FIG. 2 is shown as being flat as the present invention is applicable to both curved display screens as shown in FIG. 1 as well as to flat display screens as shown in FIG. 2. In addition, while the present invention has been illustrated in the figures in terms of use on the outer surface of the display screen of a CRT, the present invention is not limited to use with this type of display device. For example, the antistatic/antireflective coating 32 of the present invention may be used equally as well on the outer surface of the display panel of virtually any type of self-emitting color display device, i.e., where the video image is produced by phosphor activated by energetic electrons incident thereon. Self-emitting color display devices other than CRTs include field emission displays, plasma discharge panels, vacuum fluorescent screens, and gas discharge screens. The phosphor layer 24 disposed on the inner surface of the glass display screen 14 may be in the form of a large number of discrete dots or stripes.

The present invention contemplates the addition of two silane coupling agents to an antireflective coating or a combination antireflective/antistatic coating applied to the outer surface of the glass display screen of a CRT. One silane coupling agent contemplated for use in the present invention has the following structure:

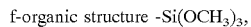

f-organic structure -Si(OCH$_3$)$_3$, where "f" is a special function group which reacts with an acid dye within the silica liquid forming the antireflective or antistatic/antireflective coating. The "-Si(OCH$_3$)$_3$" reacts with -Si(QH)$_4$ from tetraethoxy silane (TES) within the silica-based liquid coating. TES has the chemical structure Si(OC$_2$H$_5$)$_4$ The silane coupling agent serves as a strong bonding agent between the organic colored dye in the form of an acid dye and SiO$_2$ in the silica-based coating liquid which prevents leaching or washing out of the colored dye from the antireflective coating or antistatic/antireflective combination coating disposed on the outer surface of the CRT's display screen.

The-present invention further contemplates a second silane coupling agent which functions as a hydrophobic agent to prevent moisture from permeating into the antireflective or antistatic/antireflective coating on the surface of the CRT's glass faceplate. In a preferred embodiment, this second silane coupling agent has the following composition.

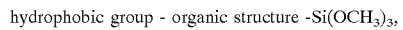

hydrophobic group - organic structure -Si(OCH$_3$)$_3$, where the "hydrophobic group" is a special function group which prevents permeation of moisture into the antireflective or antistatic/antireflective layer, "-Si(OCH$_3$)$_3$," reacts with -Si(OH)$_4$ in TES within the silica-based antireflective or antistatic/antireflective on the coating of the surface of the CRT's display screen. The second silane coupling agent prevents moisture from permeating into the antireflective or antistatic/antireflective coating when the display screen is wiped with a wet or moist cloth or in high moisture atmospheric conditions. In a preferred embodiment, the ratio of the first silane coupling agent to the dye is 6%, while the preferred ratio of the second silane coupling agent to the dye is 10%. The present invention can employ various silane coupling agents well known to those skilled in the relevant arts.

Figure 3:
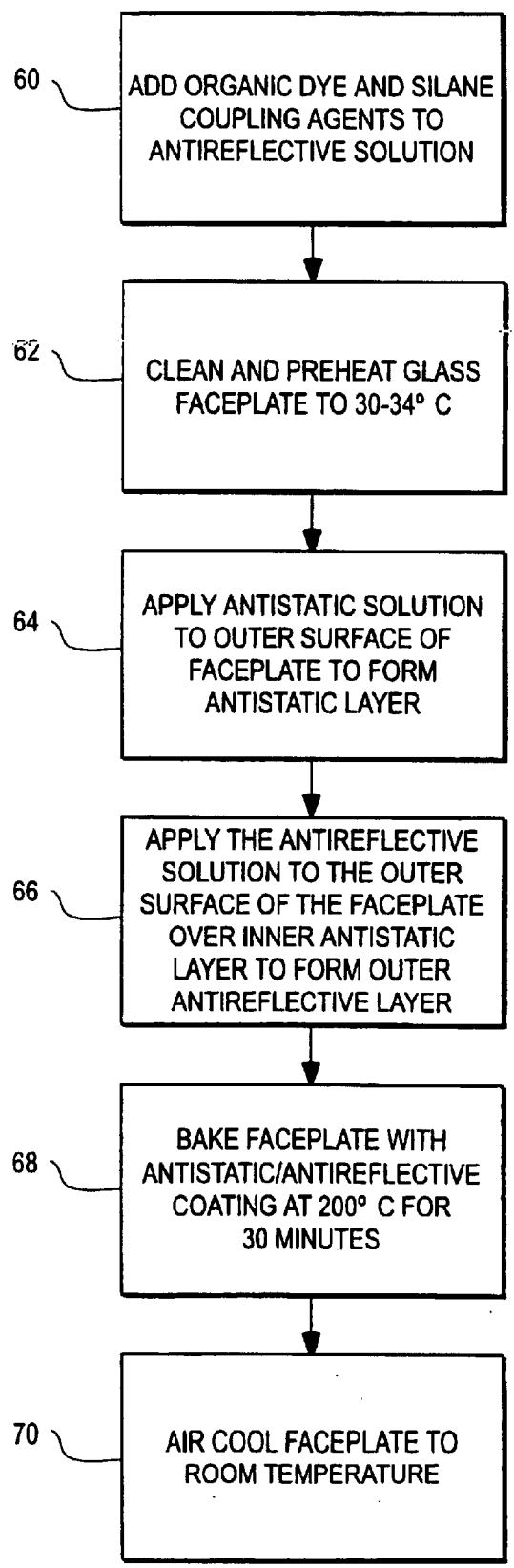
FIG. 3 is a flow chart illustrating the series of steps involved in preparing and applying the combination of an antistatic and antireflective coating to the outer surface of the display screen of a self-emitting display device in accordance with the present invention.

Referring to FIG. 3, there is shown a flow chart illustrating the series of steps involved in forming and applying the combination of an inner antistatic layer and an outer anti-reflective layer to the outer surface of a glass display screen of a CRT in accordance with one embodiment of the present invention. In step 60, an organic dye as well as the disclosed silane coupling agents are added to an antireflective solution to be applied to outer surface of the CRT's glass display screen. At step 62, the CRT's display screen, or faceplate, is cleaned and preheated to a temperature range of 30–34° C. At step 64, an antistatic solution is applied to the outer surface of the CRT's display screen to form an antistatic layer thereon. At step 66, the antireflective solution is applied to the surface of the CRT's display screen over the inner antistatic layer to form an outer anti-reflective layer. The thus coated glass display is then baked at 200° C. for approximately 30 minutes at step 68. The coated display screen in then air cooled to room temperature at step 70. The inner antistatic and outer antireflective layers are preferably applied to the CRT's display screen in a conventional manner such as by spin coating where separate antistatic and antireflective coatings are sequentially applied to the CRT's display screen. The preferred antistatic coating is comprised of indium-doped tin oxide.

A black acid dye was added to the silica liquid to provide the results described in the following paragraphs. The silica liquid was comprised of TES and two silane coupling agents. Table 1 shows the weight ratio of the first silane coupling agent to the black acid dye as well as the ratio of the second silane coupling agent to the black acid dye.

TABLE 1

|    | Second Silane Coupling Agent/Dye |    | First Silane Coupling Agent/Dye |
|----|----|----|----|
| A1 | 5%  | C1 | 3%  |
| A2 | 10% | C2 | 6%  |
| A3 | 20% | C3 | 12% |
| A4 | 40% | C4 | 24% |
| A5 | 80% | C5 | 48% |

The weight ratio of the first silane coupling agent to the black acid dye as well as the weight ratio of the the second silane coupling agent to the black acid dye in the silica solution for different mixtures are shown in Table 2.

TABLE 2

|       | First Silane Coupling Agent/Dye | Second Silane Coupling Agent/Dye |
|-------|----|----|
| Mix-1 | 10% | 6%  |
| Mix-2 | 6%  | 10% |
| Mix-3 | 10% | 10% |

Figure 4:
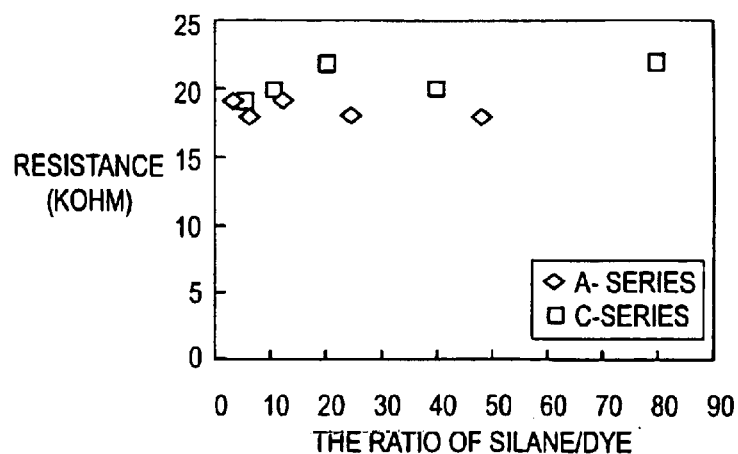
FIG. 4 is a graphic representation of the electrical resistance as a function of the ratio of silane/dye content in an antistatic/antireflective coating in accordance with the present invention disposed on the outer surface of a display screen of a video display.

The resistance of the antireflective silica solution containing the disclosed silane coupling agents for the compositions shown in Table 1 are shown graphically in FIG. 4. The resistance of the silane-based solution as a function of the content of the first silane coupling agent and the second silane coupling agent is also shown in Table 3. From FIG. 4 and Table 3, it can be seen that the silica-based solution's resistance is independent of the content of either the first or second silane coupling agent. The electrical resistance was measured by a high-resistance meter, with the MCP-HT260 system available from Mitsubishi Petro Chemical. The hardness of the coating containing the two silane coupling agents was tested using the pencil hardness test from 1H to 9H, with a loading of 1 Kgf. It was found that the hardness of the coating decreased as the content of the silane coupling agents increased, with the silane coupling agents having a softer structure. Therefore, the amount of silane coupling agent which can be added is not without limit, even if the moisture resistance characteristics improve with increased silane coupling agent content. By using two silane coupling agents, each performing a different function, the desirable mechanical properties of the coating may be retained by using less amounts of silane coupling agent.

TABLE 3

|       | Resistance (k) |
|-------|----|
| Mix-1 | 19 |
| Mix-2 | 18 |
| Mix-3 | 20 |

Table 4 shows that the light transmittance of the coating is a function of the content of the two silane coupling agents. Table 4 shows that the light transmittance is lower because more dye was retained by the coating after wiping as a result of the addition of the silane coupling agent. However, the desirable mechanical properties of the coating may be lost by adding too much silane coupling agent.

TABLE 4

| No. | T (ratio) |
|-----|-----------|
| A1  | 50.4%     |
| A2  | 50%       |
| A3  | 48.2%     |
| A4  | 46.4%     |
| A5  | 46%       |
| C1  | 49.3%     |
| C2  | 47.8%     |
| C3  | 47.2%     |
| C4  | 46.8%     |
| C5  | 46.2%     |
| NS (non silane) | 51.2% |
| Mix-1 | 48.6%   |
| Mix-2 | 46.1%   |
| Mix-3 | 45.8%   |
| Mix-4 | 46.1%   |
| Mix-5 | 46%     |

Figure 5:
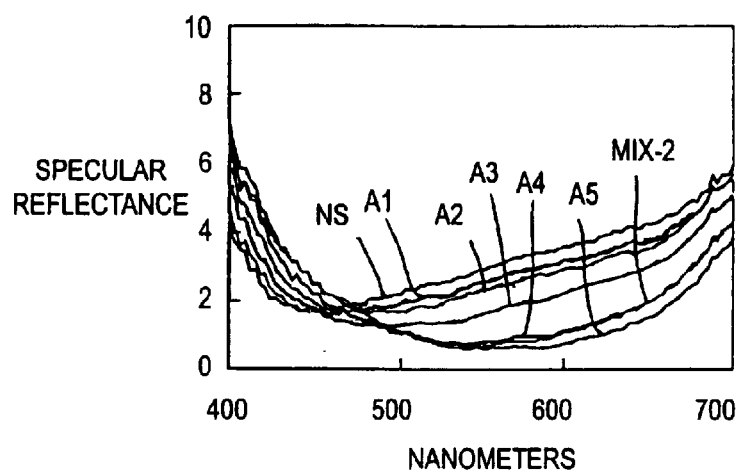
FIG. 5 is a graphic representation of the specular reflectance as a function of MS-80 silane coupling agent content in an antistatic/antireflective coating for a video display in accordance with the present invention.
Figure 6:
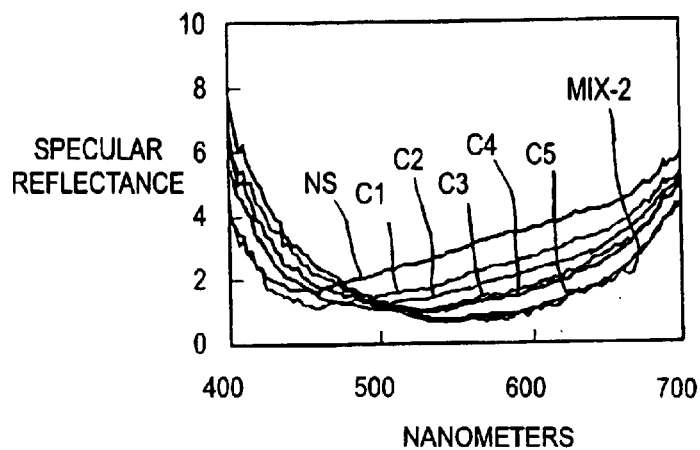
FIG. 6 is a graphic representation of the dependence of specular reflectance on MS-50 silane coupling agent content in an antistatic/antireflective coating for a video display in accordance with the present invention.

Referring to FIG. 5, there is shown a graphic illustration of the reflectivity of a surface coating having a range of weight ratios of the first silane coupling agent and the second silane coupling agent to the organic dye within the coating in accordance with the present invention. With an increase in the content of the silane coupling agents, the reflectivity curve of the coating is lowered. As the content of the silane coupling agents increases, more dye is retained in the coating after wiping. In general, it is desirable to reduce the light intensity as low as possible in order to increase the video image contrast. The black dye in the coating absorbs the light and decreases the reflectance. Thus, a lower reflectivity curve is obtained with an increase in the content of the silane coupling agents in the coating.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use on an outer surface of a glass faceplate of a self-emitting display device, wherein the glass faceplate includes a phosphor coating on an inner surface thereof, and wherein the phosphor coating is responsive to energetic electrons incident thereon for providing light for presentation of a video image on the glass faceplate, a coating comprising:
    an antireflective layer disposed on the outer surface of the faceplate;
    an organic dye disposed in said antireflective layer for increasing color purity and contrast of the video image presented on the glass faceplate;
    a first silane binding agent disposed in the antireflective layer for bonding to the dye and preventing diffusion of the dye out of the antireflective layer; and
    a second silane binding agent disposed in and bonded to the antireflective layer for providing the antireflective layer with increased water resistance for preventing washing out of the dye from the antireflective layer.

2. The coating of claim 1 wherein said organic dye is acidic and said antireflective layer includes TES, and wherein said first silane binding agent has a structure of:

$$\text{f-organic structure -Si(OCH}_3)_3$$

where f is a function group which reacts with said organic dye and $-Si(OCH_3)_3$ reacts with $Si(OH)_4$ in said TES.

3. The coating of claim 2 wherein the ratio of said first silane binding agent to organic dye is 6:100.

4. The coating of claim 1 wherein said second silane binding agent is a hydrophobic silane binding agent.

5. The coating of claim 4 wherein said second silane binding agent reduces moisture permeation in said antireflective layer in high humidity conditions.

6. The coating of claim 5 wherein said second silane binding agent has a structure of:

$$\text{hydrophobic group - organic structure -Si (OCH}_3)_3$$

where the hydrophobic group reduces moisture permeation into said antireflective layer.

7. The coating of claim 6 wherein the ratio of said second silane binding agent to said organic dye is 1:10.

8. The coating of claim 1 wherein said antireflective layer is also antistatic in composition.

9. The coating of claim 1 further comprising an antistatic layer disposed intermediate and in contact with the glass faceplate and said antireflective layer.

* * * * *

UNITED STATES PATENT AND TRADEMARK OFFICE
CERTIFICATE OF CORRECTION

PATENT NO. : 6,746,530 B2
DATED : June 8, 2004
INVENTOR(S) : Shi-Sheng Wang

It is certified that error appears in the above-identified patent and that said Letters Patent is hereby corrected as shown below:

<u>Column 4,</u>
Line 43, delete "Si(QH)$_4$" and insert in its place -- -Si(OH)$_4$ --
Line 45, insert a period after "Si(OC$_2$H$_5$)$_4$" thereby ending the sentence.
Line 52, delete "The-present" and insert in its place -- The present --

Signed and Sealed this

Sixteenth Day of November, 2004

JON W. DUDAS
*Director of the United States Patent and Trademark Office*